(12) United States Patent
Cho et al.

(10) Patent No.: US 11,720,790 B2
(45) Date of Patent: Aug. 8, 2023

(54) METHOD OF TRAINING IMAGE DEEP LEARNING MODEL AND DEVICE THEREOF

(71) Applicants: ELECTRONICS AND TELECOMMUNICATIONS RESEARCH INSTITUTE, Daejeon (KR); INFORMATION TECHNOLOGY UNIVERSITY (ITU), Lahore (PK)

(72) Inventors: Yong Ju Cho, Daejeon (KR); Jeong Il Seo, Daejeon (KR); Rehan Hafiz, Lahore (PK); Mohsen Ali, Lahore (PK); Muhammad Faisal, Lahore (PK); Aman Irshad, Lahore (PK)

(73) Assignees: Electronics and Telecommunications Research Institute, Daejeon (KR); INFORMATION TECHNOLOGY UNIVERSITY (ITU), Lahore (PK)

( * ) Notice: Subject to any disclaimer, the term of this patent is extended or adjusted under 35 U.S.C. 154(b) by 334 days.

(21) Appl. No.: 16/879,885

(22) Filed: May 21, 2020

(65) Prior Publication Data

US 2020/0372350 A1 Nov. 26, 2020

(30) Foreign Application Priority Data

May 22, 2019 (KR) .......... 10-2019-0060029
May 14, 2020 (KR) .......... 10-2020-0057460

(51) Int. Cl.
*G06N 3/08* (2023.01)
*G06F 18/22* (2023.01)
(Continued)

(52) U.S. Cl.
CPC ............ *G06N 3/08* (2013.01); *G06F 17/16* (2013.01); *G06F 18/22* (2023.01); *G06F 18/23* (2023.01);
(Continued)

(58) Field of Classification Search
CPC .... G06F 17/16; G06K 9/6232; G06K 9/6234; G06K 9/6256; G06K 9/6272;
(Continued)

(56) References Cited

U.S. PATENT DOCUMENTS

| 2017/0228641 A1 | 8/2017 | Sohn |
| 2018/0123797 A1 | 5/2018 | Noh et al. |
| 2019/0332625 A1 | 10/2019 | Lee et al. |

FOREIGN PATENT DOCUMENTS

| JP | 2019-509551 A | 4/2019 |
| KR | 10-2019-0028749 A | 3/2019 |

(Continued)

OTHER PUBLICATIONS

Mishchuk, Anastasiia, et al. "Working hard to know your neighbor's margins: Local descriptor learning loss." *Advances in Neural Information Processing Systems*, 31st Conference on Neural Information Processing Systems, Long Beach, California, USA, 2017 (pp. 1-12).

(Continued)

*Primary Examiner* — Sean M Conner
*Assistant Examiner* — Stephen M Brinich
(74) *Attorney, Agent, or Firm* — NSIP Law

(57) ABSTRACT

Disclosed herein is an image deep learning model training method. The method includes sampling a twin negative comprising a first negative sample and a second negative sample by selecting the first negative sample with a highest similarity out of an anchor sample and a positive sample constituting a matching pair in each class and by selecting the second negative sample with a highest similarity to the first negative sample, and training the samples to minimize a loss of a loss function in each class by utilizing the anchor sample, the positive sample, the first and second negative samples for each class. The first negative sample is selected in a different class from a class comprising the matching (Continued)

pair, and the second negative sample is selected in a different class from classes comprising the matching pair and the first negative sample.

18 Claims, 12 Drawing Sheets

(51) Int. Cl.
*G06F 18/23* (2023.01)
*G06V 10/82* (2022.01)
*G06F 17/16* (2006.01)
*G06V 10/764* (2022.01)
*G06V 10/77* (2022.01)
*G06V 10/774* (2022.01)

(52) U.S. Cl.
CPC .......... *G06V 10/764* (2022.01); *G06V 10/774* (2022.01); *G06V 10/7715* (2022.01); *G06V 10/82* (2022.01)

(58) Field of Classification Search
CPC .... G06K 9/6273; G06K 9/6276; G06V 10/82; G06V 10/774

USPC ...... 706/15–16, 18, 20, 25–26; 382/155–160
See application file for complete search history.

(56) References Cited

FOREIGN PATENT DOCUMENTS

| KR | 10-2019-0117955 | 10/2019 | |
|---|---|---|---|
| WO | WO-2018148493 A1 * | 8/2018 | ......... G06K 9/00711 |
| WO | WO-2021050170 A1 * | 3/2021 | ............ G06F 40/30 |

OTHER PUBLICATIONS

Chen, Weihua et al., "Beyond Triplet Loss: A Deep Quadruplet Network for Person Re-identification", *2017 IEEE Conference on Computer Vision and Pattern Recognition (CVPR)*, 2017 (pp. 1-10).
Irshad, Aman et al., "Twin-Net Descriptor: Twin Negative Mining With Quad Loss for Patch-Based Matching", *IEEE*, vol. 7, 2019 (pp. 1-11).

* cited by examiner

FIG. 7

---
Algorithm: Twin Sampling Strategy. For Each Anchor-Positive Pair We Get a Set Pair of Twin Negatives
---
Data: $n$ matching pairs
Result: Twin Negatives Set: $(N_{t1}, N_{t2})$
$n \leftarrow batchsize$;
$X_a \leftarrow g(a_1), g(a_2), \ldots, g(a_n)$;
$X_p \leftarrow g(p_1), g(p_2), \ldots, g(p_n)$;
$D(a, p) \leftarrow \sqrt{2 - 2X_a^T X_p}$;
$N_{t1} \leftarrow \{\}\ N_{t2} \leftarrow \{\}$;
for each $(a_i, p_i)$ in $D$ do
    $j \leftarrow argmin_{j=1\ldots n, j \neq i} D(i, j)$;
    $k \leftarrow argmin_{k=1\ldots n, k \neq i} D(k, i)$;
    $n_j \leftarrow p_j$;
    $n_k \leftarrow a_k$;
    if $D(i, j) < D(k, i)$ then
        $n_{t1} \leftarrow n_j\ t2 \leftarrow argmin_{c=1\ldots n, c \neq j, c \neq i} D(c, j)$
        $n_{t2} \leftarrow a_{t2}$
    else
        $t1 \leftarrow argmin_{r=1\ldots n, r \neq k, r \neq i} D(k, r)\ n_{t1} \leftarrow p_{t1}$
        $n_{t2} \leftarrow n_k$
    end
    $N_{t1}[i] \leftarrow n_{t1}\ N_{t2}[i] \leftarrow n_{t2}$
end

FIG. 8

| Training | Notredame | Yosemite | Liberty | Yosemite | Liberty | Notredame | Mean |
|---|---|---|---|---|---|---|---|
| Testing | Liberty | | Notredame | | Yosemite | | |
| SIFT [6] | 29.84 | | 22.53 | | 27.29 | | |
| MatchNet [25] | 7.04 | 11.47 | 3.82 | 5.65 | 11.60 | 8.70 | 8.05 |
| Tfeat-Margin* [11] | 7.39 | 10.31 | 3.06 | 3.80 | 8.06 | 7.24 | 6.64 |
| L2Net+ [12] | 2.36 | 4.70 | 0.72 | 1.29 | 2.57 | 1.71 | 2.23 |
| HardNet+ [13] | 1.49 | 2.51 | 0.53 | 0.78 | 1.96 | 1.84 | 1.51 |
| DOAP+ [26] | 1.54 | 2.62 | 0.43 | 0.87 | 2.00 | 1.21 | 1.45 |
| DOAP-ST+ [26] | 1.47 | 2.29 | 0.39 | 0.78 | 1.98 | 1.35 | 1.38 |
| Patch-Match-Net+ [27] | 6.72 | 7.03 | 3.78 | 4.32 | 8.43 | 11.50 | 6.96 |
| Twin-Net+ | 1.19 | 2.12 | 0.41 | 0.69 | 1.58 | 1.62 | 1.27 |

FIG. 10

| Model | Verification | Retrieval | Matching |
|---|---|---|---|
| HardNet-Lib | 88.34% | 73.95% | 55.63% |
| Twin-Net-Lib | 89.07% | 75.54% | 57.05% |
| HardNet-Brown | 89.37% | 76.99% | 57.73% |
| Twin-Net-Brown | 90.13% | 78.93% | 59.53% |

FIG. 11

| Model | Verification | Retrieval | Matching |
|---|---|---|---|
| HardNet-Lib | 88.60% | 65.79% | 49.86% |
| Twin-Net-Lib | 89.06% | 67.87% | 50.82% |
| HardNet-Brown | 89.44% | 68.46% | 51.50% |
| Twin-Net-Brown | 89.96% | 71.03% | 52.90% |

| Loss (Sampling) | Verification | Retrieval | Matching |
|---|---|---|---|
| Triplet Margin (R) | 55.30% | 23.94% | 4.14% |
| Twin-Net (R) | 56.70% | 24.90% | 4.38% |
| Triplet Margin (HardNet) | 88.43% | 69.81% | 52.76% |
| Twin-Net | 89.06% | 71.66% | 53.95% |

METHOD OF TRAINING IMAGE DEEP LEARNING MODEL AND DEVICE THEREOF

CROSS REFERENCE TO RELATED APPLICATION

The present application claims priority to Korean Patent Application No. 10-2019-0060029 filed on May 22, 2019 and Korean Patent Application No. 10-2020-0057460 filed on May 14, 2020, the entire contents of which is incorporated herein for all purposes by this reference.

BACKGROUND OF THE INVENTION

1. Field of the Invention

The present disclosure relates to a method and device for training an image deep learning model. Particularly, the present disclosure relates to the method and device for training an image deep learning model for improving deep learning-based feature description and matching performance.

2. Description of the Related Art

In the field of the next-generation realistic media (computer vision) like UWV (Ultra Wide Vision), 360 VR and 3D reconstruction, feature description is widely used as a key technique. Although hand-crafted techniques like SIFT and SURF are mainly used, the feature description technique through deep learning is being actively studied. A point that is extracted as a feature is expressed by a descriptor. For a same feature in a 3D coordinate system, a correspondence is searched through descriptor matching. A deep learning-based feature description technique generates a descriptor mostly by using a patch around an extracted feature. However, in the case of a patch with a similar image, since a very similar descriptor is generated without correspondence, delicate training is required. In other words, such a deep learning network shows a large difference of performance because of the type of loss function and sampling for network training.

In addition, a deep learning network shows a large difference of performance due to the type of loss function and sampling for network training. In other words, although a triplet loss function is proposed to extend an inter class distance for network training, there is no function that decreases a distance between samples within one class, that is, an intra class distance.

In the area of person re-identification, a quadruplet loss function is proposed which can decrease an intra class distance. Unlike person re-identification, a feature descriptor does not have a defined class or a fixed number of classes, and the number of matched patches and that of non-matched patch datasets are significantly different. Because of such a limitation related to data characteristic, an efficient sampling method is required.

SUMMARY OF THE INVENTION

Accordingly, the present invention has been made keeping in mind the above problems occurring in the prior art.

An object of the present invention is to provide an image deep learning model training method and device for improving deep learning-based feature description and matching performance.

The objects of the present invention are not limited to the above-mentioned technical object, and other technical objects that are not mentioned will be clearly understood by those skilled in the art through the following descriptions.

According to the present invention, there is provided a method of training an image deep learning model including sampling a twin negative comprising a first negative sample and a second negative sample by selecting the first negative sample with a highest similarity out of an anchor sample and a positive sample constituting a matching pair in each class and by selecting the second negative sample with a highest similarity to the first negative sample, and training the samples to minimize a loss of a loss function in each class by utilizing the anchor sample, the positive sample, the first and second negative samples for each class, wherein the first negative sample is selected in a different class from a class comprising the matching pair, and the second negative sample is selected in a different class from classes comprising the matching pair and the first negative sample.

According to another embodiment of the present invention, there is provided a device for training an image deep learning model comprising a transceiver receiving samples for a training target, a memory storing a program training an image deep learning model for the samples, and a processor executing the program, wherein the processor using the program executes sampling of a twin negative comprising a first negative sample and a second negative sample, by selecting any one with a highest similarity out of an anchor sample and a positive sample constituting a matching pair as the first negative sample and selecting the second negative sample with a highest similarity to the first negative sample, and training the samples to minimize a loss of a loss function in each class by utilizing the anchor sample, the positive sample, and the first and second negative samples for each class, wherein the first negative sample is selected in a different class from a class comprising the matching pair, and the second negative sample is selected in a different class from classes comprising the matching pair and the first negative sample.

The following matters are commonly applicable to the method of providing the moving object sharing service, the moving object and the system.

According to the embodiment of the present invention, a multiplicity of first non-matching pairs may comprise the positive sample of the matching pair and anchor samples belonging to classes different from the class respectively as pair elements and a multiplicity of second non-matching pairs comprising the anchor sample of the matching pair and positive samples belonging to classes different from the class respectively as pair elements are adopted as first negative candidates, and the anchor or positive sample of the different class belonging to a non-matching pair with the highest similarity among the first and second non-matching pairs is selected as the first negative sample.

According to the embodiment of the present invention, a multiplicity of third non-matching pair may comprise any one sample of the anchor sample and the positive sample constituting the first negative sample as a first element of a pair and respective samples belonging to different classes from the matching pair and the first negative sample and to a different kind from that of the first negative sample as a second element of the pair is adopted as a second negative candidate, and a sample of the different kind belonging to a third non-matching pair with a highest similarity among the third non-matching pairs may be selected as the second negative sample.

According to the embodiment of the present invention, the class may make clusters of the anchor sample and the positive sample for images based on a same object, and the matching pair may be a pair of the anchor sample and the positive sample, which are extracted at a same location in an image of the same object, and the anchor sample, the positive sample, and the first and second negative samples may include patches that are obtained in pixels of predetermined unit around a feature extracted from an image.

According to the embodiment of the present invention, the similarity may be calculated based on a distance between different kinds of samples, and the highest similarity may judge a sample with a shortest distance among distances of the samples as a negative sample.

According to the embodiment of the present invention, the distance may be calculated using a descriptor describing a patch of the anchor sample and the positive sample, and the descriptor may have an n-dimensional vector.

According to the embodiment of the present invention, the distance may be $L_2$ distance between the samples.

According to the embodiment of the present invention, the loss function may comprise an inter class distance function defining a distance between different classes and an intra class distance function defining a distance between samples within a same class.

According to the embodiment of the present invention, the inter class distance function and the intra class distance function may not computed by adding up all the classes but are computed for each class, and then the samples may be learned to minimize the loss of the loss function in each class.

According to the embodiment of the present invention, the inter class distance function may comprise a first margin and the intra class distance function may comprise a second margin, and the first margin may be set to a larger value than the second margin.

The features briefly summarized above for this disclosure are only exemplary aspects of the detailed description of the disclosure which follow, and are not intended to limit the scope of the disclosure.

Effects obtained in the present disclosure are not limited to the above-mentioned effects, and other effects not mentioned above may be clearly understood by those skilled in the art from the following description.

BRIEF DESCRIPTION OF THE DRAWINGS

FIG. 7 is a view illustrating an algorithm that obtains sampling of twin negatives.

FIG. 8 is a table showing descriptor performance for a patch verification task on a brown dataset.

FIG. 10 is a table showing results for HPatches "view" split.

FIG. 11 is a table showing results for HPatches "ilium" split.

DETAILED DESCRIPTION OF THE INVENTION

Figure 1:
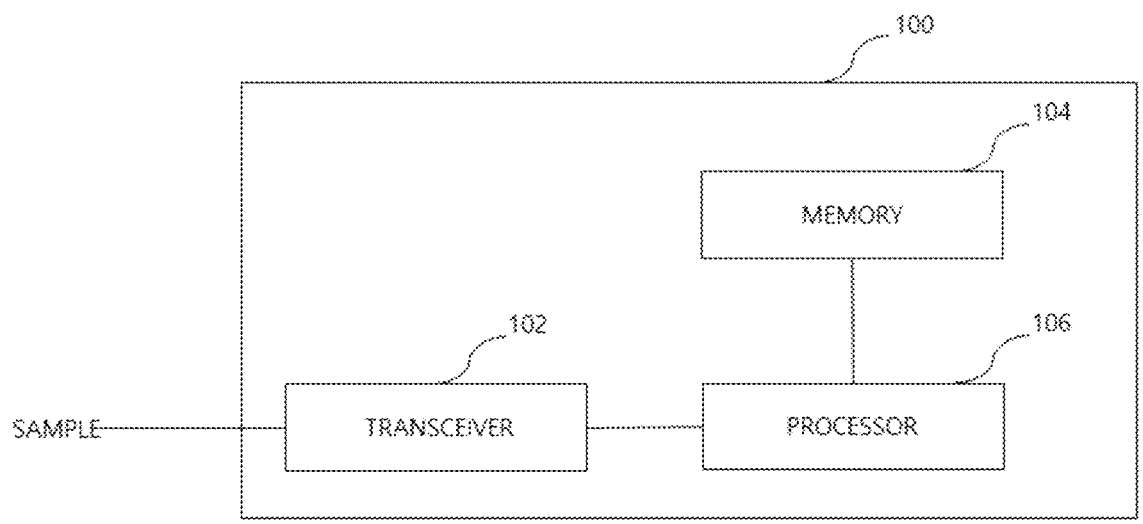
FIG. 1 is a block diagram illustrating a device for training an image deep learning model according to one embodiment of the present invention.

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, the terms first, second, etc. are only used to distinguish one element from another and do not limit the order or the degree of importance between the elements unless specifically mentioned. Accordingly, a first element in an embodiment could be termed a second element in another embodiment, and, similarly, a second element in an embodiment could be termed a first element in another embodiment, without departing from the scope of the present disclosure.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

The advantages and features of the present invention and the way of attaining them will become apparent with reference to embodiments described below in detail in conjunction with the accompanying drawings. Embodiments, however, may be embodied in many different forms and should not be constructed as being limited to example embodiments set forth herein. Rather, these embodiments are provided so that this disclosure will be complete and will fully convey the scope of the invention to those skilled in the art.

Hereinafter, embodiments of the present disclosure will be described with reference to the accompanying drawings.

Referring to FIG. 1, a device for training an image deep learning model according to one embodiment of the present invention will be described.

FIG. 1 is a block diagram illustrating a device for training an image deep learning model according to one embodiment of the present invention.

The image deep learning model training device 100 trains an image deep learning model by receiving samples including images of different objects. For example, an image deep learning model may be a deep CNN (Convolutional Neural Network). Images comprise samples of objects that are different from each other. A multiplicity of samples that are already judged as the same objects may cluster, and only one sample may be exist in a particular object. Specifically, images may cluster into classes classified by objects, and clustering images may include an anchor sample and a positive sample. The anchor sample and the positive sample in each class may be extracted from a same location within an image of a same object. As samples of each class include only the same object across the entire image, they may be obtained from various perspectives for the same object. In addition, while samples of each class include the same object in an image, a different object may be included in each sample. The anchor sample and the positive sample may have patches obtained in predesignated pixel units around a feature extracted from each image. For example, a patch may consist of 32×32 pixels. In order to describe a feature, a patch is described by a descriptor including a n-dimensional descriptor. A descriptor may be 128-dimensional like SIFT (Scale Invariant Feature Transform). As the anchor sample and the positive sample are close to each other based on their descriptor, they may be patches that are judged to have a high similarity representing the same object. The anchor sample and the positive sample may be determined before they are input into the image deep learning model training device 100. Alternatively, the anchor sample and the positive sample may be determined in the device 100 before a method according to one embodiment of the present invention is implemented. Based on the above-described meaning, the anchor sample and the positive sample may be recognized as a pair, thereby constituting a matching pair. First and second negative samples belonging to a twin negative, which will be described below, also comprise patches. A negative patch may include a descriptor for feature description. An image deep learning model according to this embodiment may be trained by adjusting a descriptor of a patch. In the present specification, 'sample' and 'patch' have substantially same meaning and are used interchangeably, if necessary.

The device for image deep learning model 100 includes a transceiver 102, a memory 104 and a processor 106.

The transceiver 102 receives samples including images of different objects from outside or sensors (not illustrated) installed inside the device.

In case the transceiver 102 receives an image from outside, it may include wired or wireless communication modules receiving the image. A wired communication module may be implemented with a power line communication device, a telephone line communication device, a cable home (MoCA), Ethernet, IEEE1294, an integrated cable home network, and an RS-485 control device. Also, the wireless communication module may be implemented with wireless LAN (WLAN), Bluetooth, HDR WPAN, UWB, ZigBee, Impulse Radio, 60 GHz WPAN, Binary-CDMA, wireless USB technology, wireless HDMI technology, and/or the like.

In order to recognize an object, a sensor may include an image senor, a microphone and the like for sensing image and voice data. A sensor may detect an image in a well-known way (for example, converting an optical image into an electric signal).

The output of a sensor may be outputted to the processor 106 or the memory 104 through a bus of the transceiver 102.

The memory 104 stores a program training a deep learning model for samples. Here, the memory 104 refers to not only a volatile storage device but also a non-volatile storage device that keeps stored data even when no power is supplied. For example, the memory 104 may include NAND flash memories like a CF (Compact Flash) card, a SD (Secure Digital) card, a memory stick, a SSD (Solid-State Drive) and a micro SD card, a magnetic computer memory device like HDD (Hard Disk Drive), and an optical disc drive like CD-ROM and DVD-ROM.

The processor 106 executes a program stored in the memory 104 and may train an image deep learning model for samples by executing such a program.

By the program stored in the memory 104, the processor 106 selects either the anchor sample or the positive sample, which constitute a matching pair in each class, as a first negative sample with the highest similarity and also selects a second negative sample with the highest similarity to the first negative sample. Thus, the processor 106 executes a process of sampling a twin negative including the first and second negative samples. In addition, the processor 106 executes a sample learning process for minimizing the loss of a loss function in each class by utilizing the anchor sample, the positive sample, the first negative sample and the second negative sample for each class. In this case, the first negative sample is selected in a different class from a class including a matching pair, and the second negative sample is selected in a different class from the classes including the matching pair and the first negative sample, respectively. Training of an image deep learning model through the processor 106 will be described in detail in FIG. 2 to FIG. 7.

For reference, the components illustrated in FIG. 1 according to one embodiment of the present invention may be implemented in software form or hardware form like FPGA (Field Programmable Gate Array) or ASIC (Application Specific Integrated Circuit). Also, the components may play predetermined roles.

Hereinafter, with reference to FIG. 1 to FIG. 7, an image deep learning model training method according to another embodiment of the present invention will be described. The embodiment below may be implemented with the above-described image deep learning model training device 100, and each step of FIG. 2 may be executed when the processor 106 implements a program stored in the memory 104.

Figure 2:
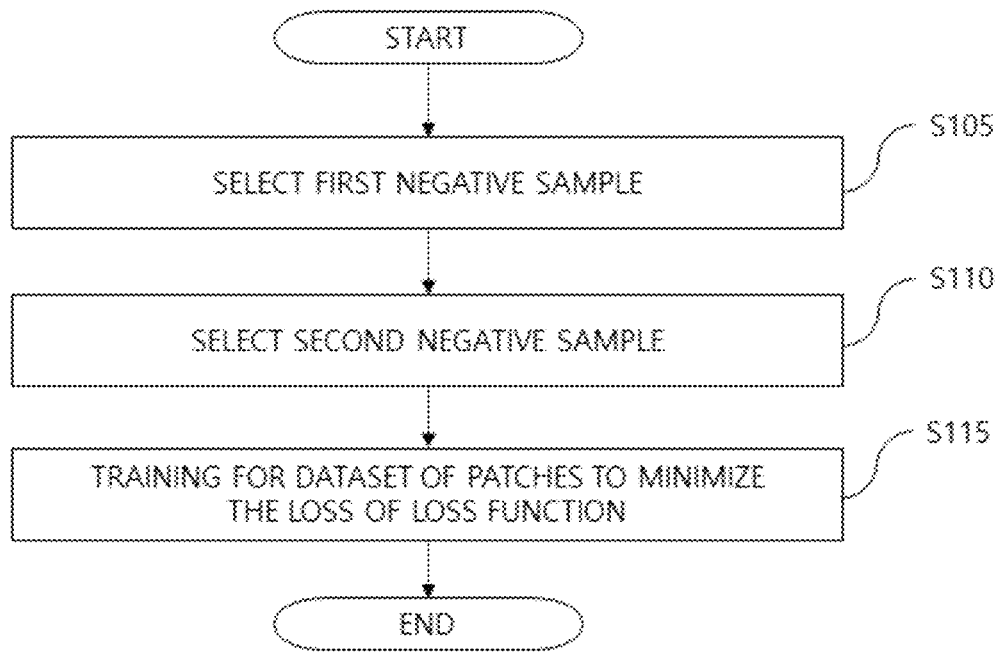
FIG. 2 is a flowchart concerning a method of training an image deep learning model according to another embodiment of the present invention.

FIG. 2 is a flowchart concerning a method of training an image deep learning model according to another embodiment of the present invention.

First, samples of various objects received by the transceiver 102 may have already clustered by object. Samples may cluster into classes where they are estimated as the same object. In each class, samples may be classified into anchor samples and positive samples. The anchor sample and the positive sample may constitute a matching pair in a corresponding class. In each class, the anchor sample and the positive sample in each sample may be extracted from the same location, for example, the same 3D location within an image of the same object. For example, the anchor sample and the positive sample may be patches obtained in 32×32 pixel units around a feature extracted from each image. In order to describe a feature, a patch is described by a descriptor including a n-dimensional vector. A descriptor may be 128 dimensional like SIFT (Scale Invariant Feature Transform).

Figure 3:
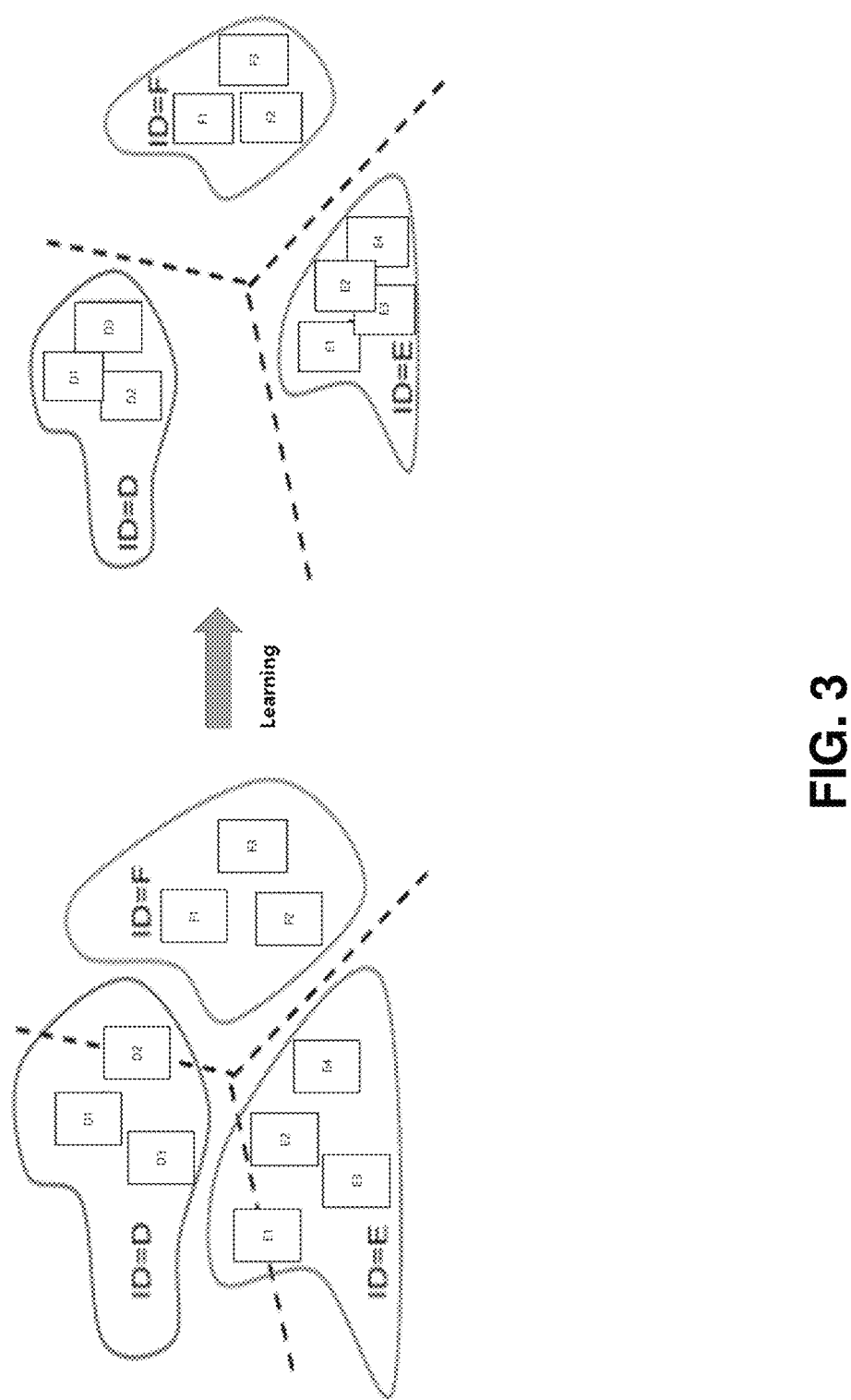
FIG. 3 and FIG. 4 are views schematically illustrating effects obtained by implementing the method of training an image deep learning model according to an embodiment of the present invention.
Figure 4:
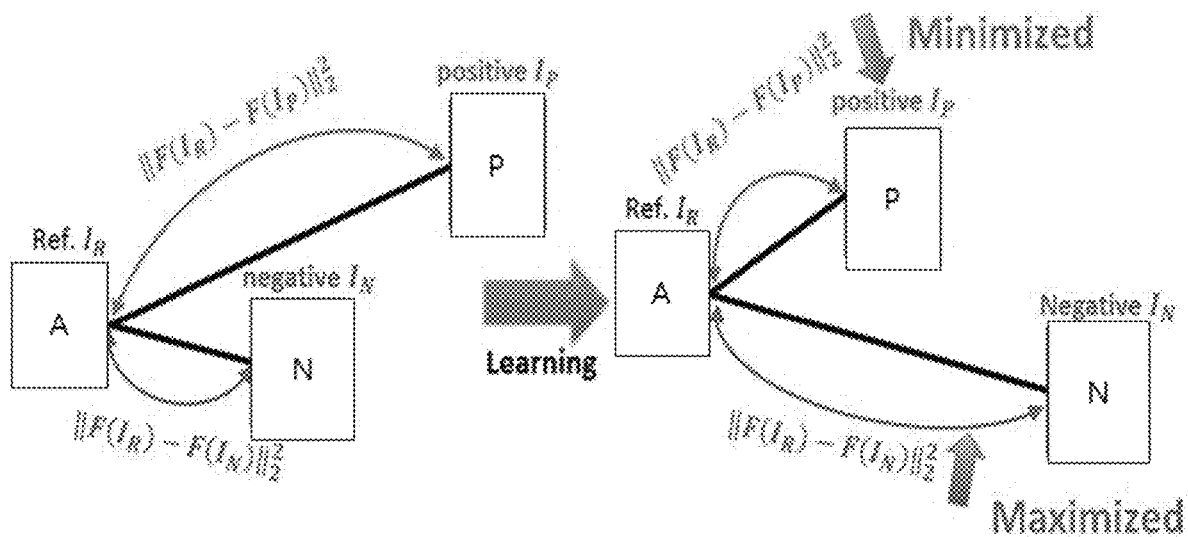

FIG. 3 and FIG. 4 are views schematically illustrating effects obtained by implementing the method of training an image deep learning model according to an embodiment of the present invention.

Referring to FIGS. 3 and 4 as an examples, each class (D, E and F) may include patches (D1~F3 in the left view of FIG. 3) consisting of the same 3D location within the same object, and patches of each class may constitute a matching pair (refer to the anchor sample ($I_R$) and the positive sample ($I_P$) of FIG. 4). In addition, patches belonging to the classes E and F, which are different from the class D, are images of objects that are different from the class D. The patches E1~E4 and F1~F3 illustrated in the left view of FIG. 3 are negative patches (samples; refer to the negative sample ($I_N$) of FIG. 4) in view of the patches D1~D3.

Referring to FIG. 2, the processor 106 selects any one of the anchor patch (sample) and the positive patch (sample), which constitute a matching pair in each class, as a first negative patch (sample) with the highest similarity (S105). Here, the first negative patch is selected in a different class from a class including the matching pair.

Figure 5:
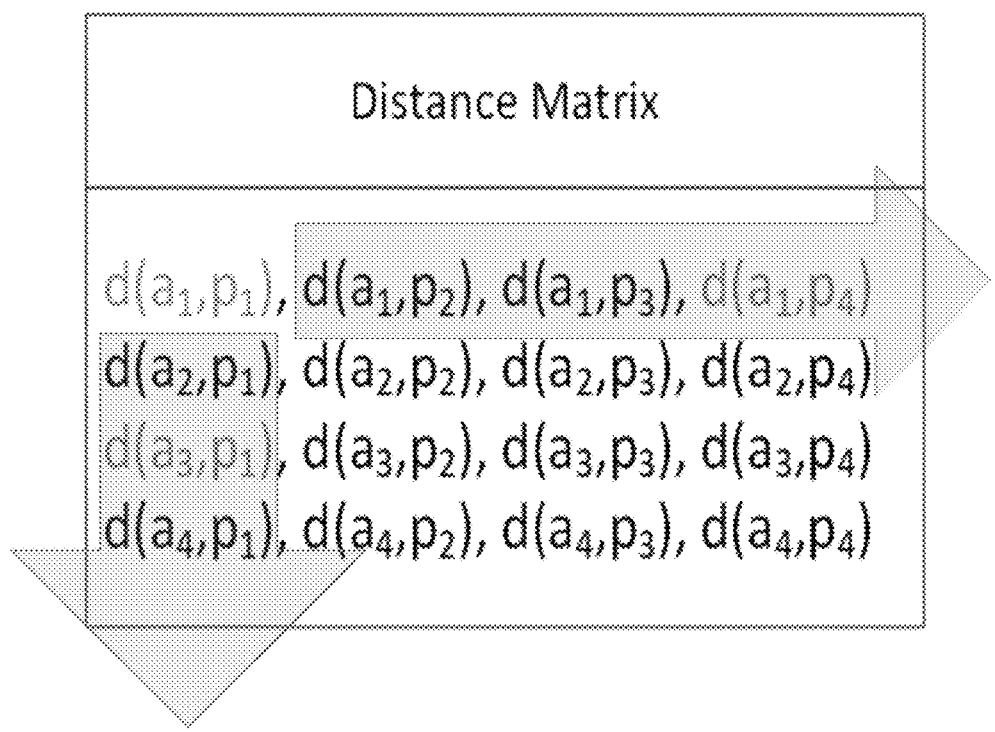
FIG. 5 is a view illustrating twin negative sampling by a distance matrix.
Figure 6:
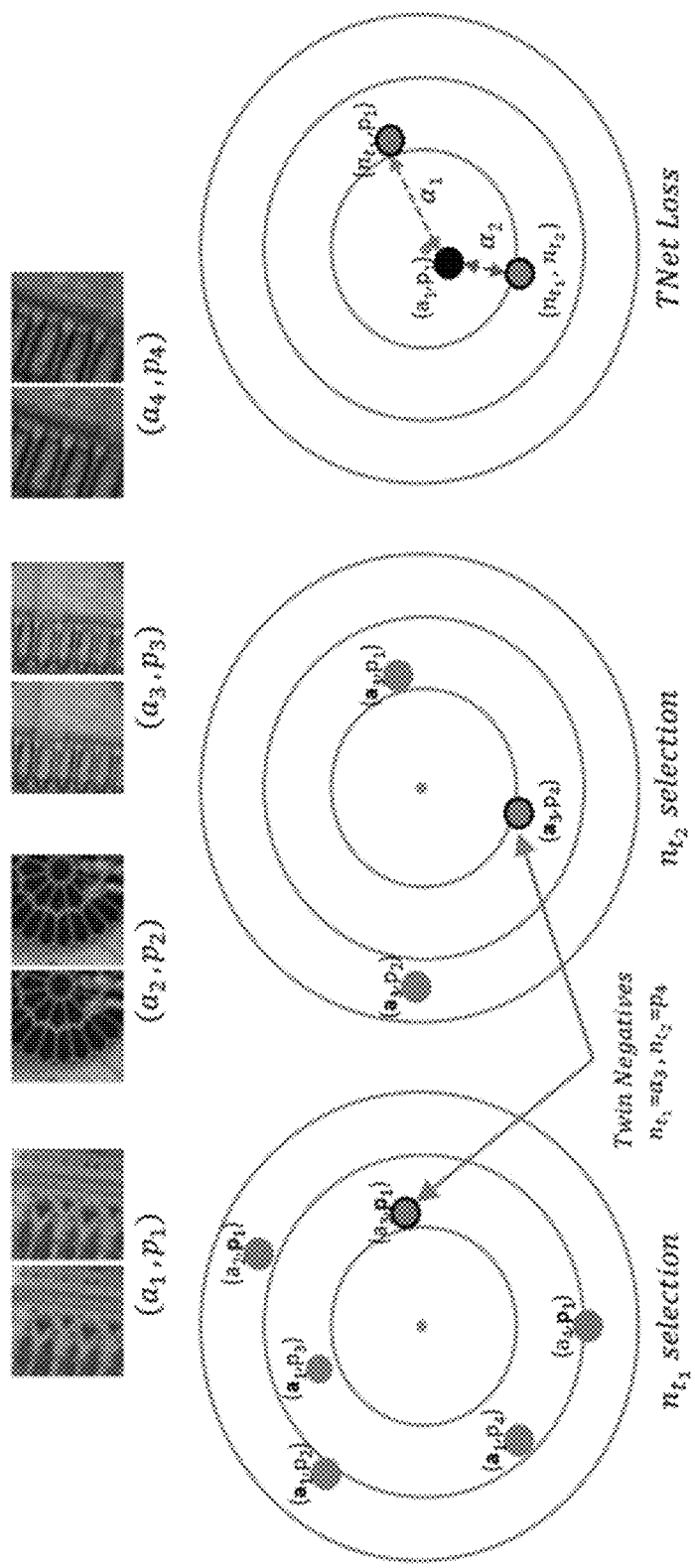
FIG. 6 is a view illustrating twin negative sampling based on the anchor patch and the positive patch constituting a matching pair.

FIG. 5 is a view illustrating twin negative sampling by a distance matrix. FIG. 6 is a view illustrating twin negative sampling based on the anchor patch and the positive patch constituting a matching pair. In FIG. 5 and FIG. 6, a and p denote the anchor patch and the positive patch, respectively. When the anchor patch and the positive patch have the same subscript number, it means that the patches constitute a matching pair. $n_{t1}$ and $n_{t2}$ are the first negative patch and the second negative patch, respectively. These pairs are a twin negative.

As illustrated in FIG. 5 and FIG. 6, the first negative patch may be selected as follows. The processor 106 may select a multiplicity of first non-matching pairs (indicated by the vertical arrow in FIG. 5), which include the positive patch ($p_1$) of a matching pair (for example, ($a_1$, $p_1$) in Class 1 of FIG. 5) and each anchor patch ($a_2$, $a_3$ and $a_4$ of FIG. 5) belonging to other classes (Classes 2~4 of FIG. 5) as pair elements, as first negative candidates. In addition, the processor 106 may select a multiplicity of second non-matching pairs (indicated by the horizontal arrow in FIG. 5), which include the anchor patch ($a_1$) of a matching pair ($a_1$, $p_1$) and each positive patch ($p_2$, $p_3$ and $p_4$ of FIG. 5) belonging to other classes (Classes 2~4 of FIG. 5) as pair elements, as first negative candidates. The processor 106 may select a different anchor sample ($a_2$~$a_4$) or positive sample ($p_2$~$p_4$) belonging to a non-matching pair with the highest similarity among first and second non-matching pairs as the first negative patch (sample). FIG. 6 illustrates that ($a_3$, $p_1$) is judged to have the highest similarity among first non-matching pairs and the anchor patch $a_3$ of a class different from the matching pair ($a_1$, $p_1$) is selected as the first negative patch. If any one of second non-matching pairs is judged to have a higher similarity than first non-matching pairs, the positive patch of the corresponding second non-matching pair is selected as the first negative patch.

The above-described similarity is calculated based on a distance between different kinds of patches, and based on the highest similarity, a patch with the smallest distance between the patches may be judged as the first negative patch. Different kinds of patches mean the anchor patch and the positive patch constituting a non-matching pair.

A distance is calculated by using descriptors of the anchor patch and the positive patch. Since a descriptor uses a 128-dimensional vector like a descriptor of hand-crafted SIFT, an embodiment of the present invention may be easily applied to a SIFT system, and the system may also be easily replaced. In addition, since a distance between patches is calculated by $L_2$ distance function, a matrix like in FIG. 5 may be calculated simultaneously and thus a distance and a similarity may be quickly calculated.

First negative candidates include one kind of patch belonging to a matching pair and a different patch belonging to a class other than the matching pair. This is intended to select a patch of a different class that is nearest to one kind of patch of a matching pair. A patch thus selected, that is, the first negative patch is a different object from a patch of a matching pair but is more similar thereto than the patches of other classes. Accordingly, when a loss function described below is utilized, the first negative patch may increase an inter class distance that is a distance between classes and may decrease an intra class distance that is a distance between samples in a class. The first negative patch thus selected may not only improve feature description and matching performance in an image deep learning model but also, as an accurate criterion, significantly decrease an error rate in distinguishing images of the same object.

A further detailed description of such the first negative patch will be described together with the second negative patch below.

Next, the processor 106 selects the second negative patch (sample) with the highest similarity to the first negative patch (S110). The second negative patch is selected in a class that is different from classes including a matching pair and the first negative sample.

As illustrated in the examples of FIG. 5 and FIG. 6, the second negative patch may be selected as follows. The processor 106 may select a multiplicity of third non-matching pairs, which includes not only any one kind of patch (for example, the anchor patch $a_3$ illustrated in FIG. 5 and FIG. 6) out of the anchor sample and the positive sample constituting the first negative patch as a first element of pair but also each patches ($p_2$, $p_4$), which belong to totally different classes (Classes 2 and 4 of FIG. 5) from the matching pair ($a_1$, $p_1$), the first negative patch ($a_3$) and consist of a different kind (positive patch) from the first negative patch ($a_3$, anchor patch), as second elements. The third non-matching pairs are selected as second negative candidates. In case of FIG. 5 and FIG. 6, second negative candidates may be ($a_3$, $p_2$) and ($a_3$, $p_4$).

The patch related to the matching pair is excluded from second negative candidates. This is to obtain the second negative patch, which is nearest and thus has a high similarity to a matching pair and the first negative pair and also represents a different object from the matching pair. Also, a patch that is selected among second negative candidates belongs to a different class from the first negative patch. This is to obtain the second negative patch that not only has the above-described high similarity to a matching pair and the first negative patch but also represents a different object from both the matching pair and the first negative patch. Thus, the second negative patch may be selected from a different class from classes including the matching pair and the first negative sample.

The processor 106 selects a different kind of patch $p_4$ in a third non-matching pair $(a_3, p_4)$, which has the highest similarity to the matching pair $(a_1, p_1)$ and the first negative patch $(a_3)$ among third non-matching pairs (like $(a_3, p_2)$ and $(a_3, p_4)$ in case of FIG. 6 and FIG. 7), as the second negative patch.

Like the similarity applied to the first negative patch, the above-described similarity is calculated based on a distance between patches, and based on the highest similarity, a patch with the smallest distance between the patches may be judged as the second negative patch. As in the first negative patch, the distance is calculated by using a descriptor of patches, and a descriptor may use a 128-dimensional vector.

In FIG. 6, the positive patch $p_4$ is selected as the second negative patch. However, when the first negative patch is selected as the positive patch, the second negative patch is selected as the anchor patch.

As described above, when first and second negative patches are selected, a twin negative is finally sampled.

As the first negative patch and the second negative patch are selected not only from classes, which are different from each other, but also as a different class from that of a matching pair, the patches are different objects from a patch of the matching pair but may be sampled as the most similar patches as compared to patches of other classes. Accordingly, when a loss function described below is utilized, an inter class distance that is a distance between classes may further increase, and an intra class distance that is a distance between samples within a class may further decrease. Since the twin negative thus selected becomes an accurate criterion for the image deep learning model, it may not only significantly decrease an error rate in distinguishing images of the same object but also improve feature description and matching performance.

Twin negative sampling will be described in detail with reference to FIG. 5 to FIG. 7.

As briefly described above, a patch $n_k$ may be defined as the twin of $n_j$, when it is very similar to $n_j$ (that is, the distance d $(n_k, n_j)$ is very short) but does not represent the same location, for example, the same 3D point.

Hereinafter will be described a method of selecting $n_k$ and $n_j$ in each iteration so that the distance $d(n_k, n_j)$ may decreases when the network of an image deep learning model is trained and the distance $d(a_i, p_i)$ decreases. Thus, as the training proceeds, a constraint becomes severer.

As a large random training data set is aimed at training and optimizing a network parameter, a simple algorithm for selecting the twin negative is designed.

In the case of the first negative patch, one non-matching sample is selected which is nearest to the anchor or the positive related to the positive pair $(a_i, p_i)$.

However, in the case of the second negative patch, a constraint applied thereto is that the second negative patch should be most similar to the first negative patch in order to form the twin $(n_1, n_2)$. This is referred to as twin negative mining.

In Equation 3 below describing a conventional quad loss function, the tuple $(a_i, p_i, n_1, n_2)$ is transferred to a quad loss. Such a loss is termed as a twin negative constraint.

The constraint is that descriptors of anchor and positive patches, which belong to the same 3D location, should be closer than those of twins which look similar but do not belong to the same 3D location.

The complete process is illustrated in FIG. 6 and each step of the designed methodology, which is provided in the algorithm of FIG. 7, is described below.

For each batch, n positive pairs (ai, pi) are selected, making sure that no other pairs belonging to the same 3D location are selected in this batch. $X_a$ and $X_p$, are set as the matrix of $L_2$-normalized descriptors generated from a network for anchor and positives patches, respectively. Each descriptor may be one column of the matrix. The pairwise $L_2$ distance between all the descriptors in the set $X_a$ and $X_p$ is calculated using Equation 1. As illustrated in FIG. 5, the diagonal of the resultant matrix D contains a distance between matched pairs, and the off-diagonal represents a distance between non-matching pairs.

$$D=\sqrt{2-2X_a^T X_p} \qquad \text{Equation 1}$$

For each positive pair $(a_i, p_i)$, the nearest negatives for both $a_i$ and $p_i$ should be selected. Here, it is assumed that negatives are denoted as $n_j$ (w.r.t anchor) and $n_k$ (w.r.t positive). From two negatives, one with the smallest distance is selected as the hardest negative candidate. This is expressed as $$n_{t1} = \operatorname{argmin}_{n_j, n_k}(d(a_i, n_j), d(p_i, n_k))$$

$n_{t2}$, which is a paired with $n_{t1}$, is selected by finding the nearest negative pair of $n_{t1}$. If $n_{t1}$ is selected from the anchor list, then $n_{t2}$ is selected among positives. On the other hand, if $n_{t1}$ is selected from the positive list, $n_{t2}$ is selected among anchors. This is because the distance matrix D provides a distance value between the elements of the anchor list and those of the positive list. D(i, j) is the distance between $a_i$ and $p_j$. For the computational cost constraint, no distance between elements within a list itself is calculated. Since the distance matrix is already calculated, the selection of the second negative does not need any extra computational overhead, except finding the nearest neighbor to the first negative. In case the nearest patch is either $a_i$ or $p_i$, the second nearest patch is selected. Here $n_{t1}$ and $n_{t2}$ are selected as twins of each other, since $n_{t2}$ is not the exact match but most similar to $n_{t1}$.

Referring to examples illustrated in FIG. 6, the concentric circles represent an $L_2$ based distance between the descriptors of patches in a pair. The dot at the center represents an $L_2$ distance of zero. Thus, a patch pair appearing closest to the center has the least $L_2$ distance. In the case of $n_{t1}$ selection, all the negative pairs including any one of $a_1$ and $p_1$ are considered. Among the pairs, a pair with the shortest distance (highlighted with a black outline) provides $n_{t1}$ since either $a_1$ or $p_1$ is the hardest negative. In FIG. 6, $a_3$ is selected as $n_{t1}$. $n_{t2}$ is selected from all the negative pairs including $a_3$. Here, $p_4$ is selected as $n_{t2}$ since it is hardest negative for $a_3$. Accordingly, (a3, p4) is selected as the twin negative.

Next, the processor 106 trains the patch data set to minimize the loss of a loss function in each class by utilizing the anchor patch, the positive patch, and first and second negative patches for each class (S115). Thus, as descriptors of patches are learned, an inter class distance further increases, and an intra class distance between patches further decreases.

A loss function for this purpose is expressed by Equation 2 below. It may include an inter class distance function as a first Max function, which defines a distance between different classes, and an intra class distance function as a second Max function that defines a distance between samples within a class. The loss function below is a quad loss function. It may be referred to as a twin net loss function using twin negative.

$$L_{Twin}(a_i,p_i,n_{t1},n_{t2})=\max(0,\alpha_1+d(a_i,p_i)-\min(d(a_i,n_{t1}),d(n_{t2},p_i)))+\max(0,\alpha_2+d(a_i,p_i)-d(n_{t1},n_{t2}))$$ Equation 2

Here, $a_i$, $p_i$, $n_{t1}$, and $n_{t2}$ may be the anchor patch, the positive patch, the first negative patch and the second negative patch, respectively. They may be descriptors of respective patches. i is a class, $\alpha_1$ is a first margin of an inter class distance function, and $\alpha_2$ is a second margin of an intra class distance function. Through training by the loss function In FIG. 3 and FIG. 4, the first margin may be set to a larger value than the second margin in order to increase the inter class distance and decrease the distance between patches in a class.

Reviewing Equation 2, the inter class distance function and the intra class distance function are not computed by adding up all the classes but are computed for each class, and then patches are trained to minimize the loss of the loss function in each class.

Unlike the conventional methodology performing metric learning, $L_2$ distance is used as the distance metric to calculate a matching probability. As it can be plugged into a suitable data structure enabling the nearest neighbor to be searched like k-D tree, it may be directly used in the existing feature matching pipelines. In addition, if a testing step has no ground truth label, using $L_2$ distance as the distance metric may improve convenience.

An intra class distance function according to the present invention is different from the conventional quad loss function expressed by Equation 3 below.

$$L_q = \sum_{i,k,l\ l\ne k\ne i}^{N} \max(0, \alpha_2 + d(a_i, p_i) - d(x_k, x_l))$$ Equation 3

Considering that there are a multiplicity of common features between the anchor patch and the positive patch constituting a matching pair (or positive pair), the conventional loss function adds intra class distances of all the classes and then calculates an average intra class distance. However, if there are only a few common features, when the conventional loss function is applied, an average intra class distance is obtained from such a few common features. According to conventional loss function, as shown in the classes D and E in the left view of FIG. 3, a distance between patches in the same class does not decrease. The left view of FIG. 3 illustrates a pre-training phase, however, in case of the conventional loss function patches that are non-illustrated training targets are inputted, and then a similar training result to the left view of FIG. 3 is obtained. In case there are only a few common features, if the conventional loss function is applied, the performance of descriptors of patches is still unsatisfactory. According to the loss function of the present embodiment, as shown in the right view of FIG. 3 and FIG. 4, the descriptor performance is significantly improved so that not only an inter class distance further increases but also an intra class distance becomes very short.

As known from TNet Loss on the far right of FIG. 6, according to an embodiment of the present invention, $d(a_1, p_1)$ becomes 0 while $d(n_{t1}, p_1)$ is pushed to a larger margin $\alpha_1$ and $d(n_{t1}, n_{t2})$ is pushed to a smaller margin $\alpha_2$.

In addition, two negative patches applied to the conventional quad loss function are randomly selected unlike the present embodiment. Since most negative patches have conventionally much longer distances than matching pairs, the loss function makes little contribution to learning the description performance of descriptors. In the embodiment of the present invention, as negative patches with the highest similarity (or the closest distance) to a matching pair are selected, good generation and fast convergence may be obtained. In addition, the descriptor performance may be significantly improved in the training through a loss function.

* Evaluation of the Example of the Subject Invention and Conventional Methods

In order to gauge the benefits of sampling strategy plus loss function according to the present embodiments, the architecture of L2-Net as a base network for Twin-Net (the embodiment of the present invention) is adopted. The network is fully convolutional, and each convolutional layer is followed by batch normalization layer and non-linear activation function Relu, except for the last layer. It is trained with input patches of size 32×32 and outputs a L2 normalized 128 dimensional feature vector. For a fair comparison with HardNet, that also utilized the architecture of L2-Net, we also added a dropout layer before the final layer with a dropout rate of 0.3. Other hyper-parameters i.e. learning rate, batch size, decay, optimizer etc. are also kept the same as in HardNet. End-to-end training is performed using the Twin Sampling according to the embodiment of the present invention (refer to Algorithm 1 in FIG. 7) and Twin loss (refer to Equation 2). The matrix D and vectors $N_{t1}$ and $N_{t2}$ are computed for each batch. The details of training datasets and our evaluation results are provided hereinafter.

To evaluate the effectiveness of our methodology of the present embodiments, extensive experiments using the Phototour and HPatches datasets. Comparison with SIFT and various state-of-the-art learned descriptors such as MatchNet, Tfeat, L2Net, HardNet, DOAP and Patch-Match-Net are provided. Discussions and results on each of these evaluations are provided below A. Brown (Phototour) Dataset Brown dataset (also called UBC Phototour) consists of six subsets: Liberty, Notre-Dame, Yosemite and their Harris affine versions. The only difference between both variants of datasets is how the keypoints are detected. Difference of Gaussian (DoG) detector has been used in the first subset, whereas Harris detector is used in the second to extract the patches. The standard evaluation strategy has been to train on a training-set of one of the subsets and evaluate on the testing data of the other two.

Although Brown (Phototour) dataset has been widely used in the past to evaluate the performance of learned descriptors, its shortcomings have also recently brought into attention. It is critiqued that the dataset not only contains false labels but also lacks task diversity and thus Patch Verification alone may not be an effective measure for evaluating the true performance of a learned descriptor. In addition to that, FPR95 has also been deemed as an unsuitable evaluation metric for unbalanced data since good performance in ROC space does not guarantee good mean Average Precision (mAP). To overcome these limitations of existing datasets and evaluation metrics, the HPatches benchmark with more evaluation tasks and data diversity is introduced, and also provided a complete evaluation framework. The evaluation on HPatches dataset is discussed below.

B. Hpatches Dataset

HPatches consists of 116 sequences of 6 images each (including one reference image). Keypoints are detected by DoG, Hessian and Harris detectors in the reference image and re-projected to the rest of the five images in each sequence with 3 levels of geometric noise: Easy, Hard, and Tough.

Thus, for each keypoint in the reference image, 15 corresponding keypoints are generated using the rest of the five images. A patch is then extracted around each of these keypoints to generate 15 positive pairs for each reference pair. HPatches provides 6 splits of training and testing data: "a", "b", "c", "view", "ilium" and "full". The reported results are from the full split.

C. Twin-Net Evaluation

Twin-Net on both Brown Dataset and HPatches are compared. A standard evaluation metric has been to compute mean average precision (mAP) for three evaluation tasks: Patch Verification, Image Matching and Patch Retrieval; and false positive rate at 95% recall (FPR95) measure for Patch Verification task. Patch verification measures how well a descriptor separates positive from negative pairs of patches. Image Matching measures how well a descriptor matches two images while Patch retrieval is to find the corresponding patches from a large collection of patches.

FPR95 score on Brown Dataset for the Twin-Net is reported and listed it against other methods in table of FIG. 8. Since SIFT is a handcrafted technique, the first row of training is not applicable to it. The best model of TFeat was chosen for performance comparison which was TFeat margin loss with anchor swap. FIG. 8 is a table showing descriptor performance for a patch verification task on a brown dataset. Referring to FIG. 8, the FPR95% is reported, and the + suffix denotes that data augmentation is applied during learning the descriptor. Best results are highlighted in bold and second best results are underlined.

Twin-Net not only has lowest FPR95 (best case) for most of the scenarios, it also has the minimum mean FPR95, with a considerable margin to second best (1.38 as compared to 1.27 according to the present embodiment).

Figure 9:
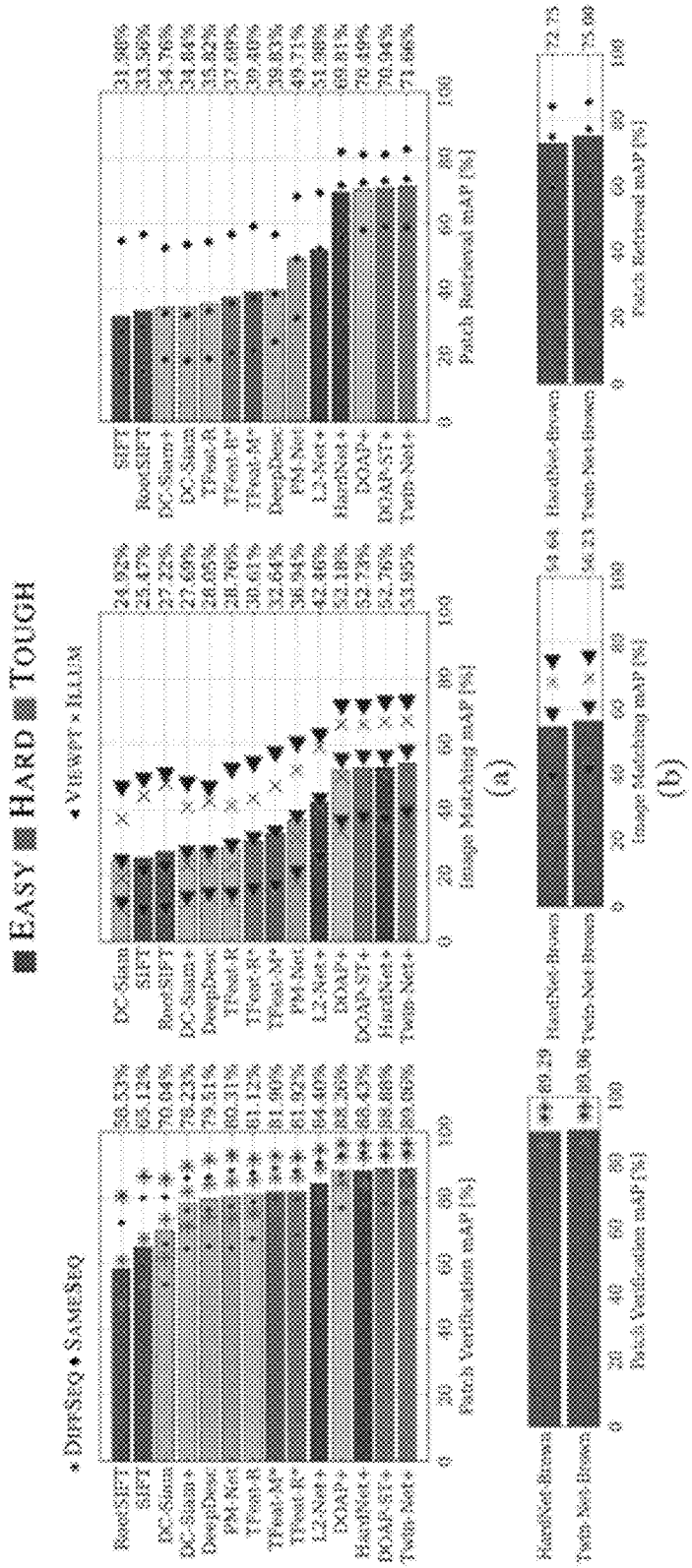
FIG. 9 is a view showing diagrams of patch verification, image matching and patch retrieval results for HPatches "full" split.

The results and comparison of Twin-Net with other methods w.r.t all three evaluation metrics (Patch Verification, Image Matching and Patch Retrieval) over HPatches is presented in FIG. 9. This evaluation, as presented in FIG. 9, is as per the recent trend to better evaluate the generalizability of the learned descriptor by training the network using Brown dataset and evaluating on HPatches.

FIG. 9 is a view showing diagrams of patch verification, image matching and patch retrieval results for HPatches "full" split.

All the methods compared in the FIG. 9(a) are either trained on Liberty subset of Brown (M. Brown, G. Hua, and S. Winder, "Discriminative learning of local image descriptors," IEEE Trans. Pattern Anal. Mach. Intell., vol. 33, no. 1, pp. 4357, January 2011), or are handcrafted. In FIG. 9(b), HardNet-Brown and Twin-Net-Brown are trained on full Brown (all six subsets) dataset. The "+" suffix denotes that data augmentation is applied during training. The degree of gray of marker represent the level of geometrical noise, EASY, Hard and TOUGH. DIFFSEQ and SAMESEQ indicate use of different or same negative sample sequences in the Patch Verification task. "VIEWPT" and "ILLUM" indicate the type of sequences used for matching. Twin-Net outperforms the rest in all evaluations tasks. Each of these models output descriptor size of 128. None of the variants was trained on HPatches.

FIG. 9(a) provides the comparison when the networks are trained on Liberty. For FIG. 9(b), Twin-Net on the complete Brown dataset is trained in order to compare with a similarly trained variant of HardNet, since only HardNet has provided the pre-trained model for full brown dataset.

It can be observed from FIG. 9 that the lowest score (worst) for all the three tasks is provided by SIFT. There are two variants of the Patch Verification task depending upon the way that negative pairs were sampled from the same sequence of images (SameSEQ) or from the different sequence (DiffSEQ). SameSEQ can provide a more difficult case, since multiple patches may be containing similar information thus making it more challenging for patch verification. Twin-Net-Lib according to the present embodiment is not only outperforming its liberty-trained counterparts (refer to FIG. 9(a)) on all evaluation tasks but is also just marginally trailing behind the HardNet-Brown which was trained on the complete Brown dataset.

Finally, it can be observed that Twin-Net-Brown outperforms the Hardnet-Brown on all the evaluation tasks by a reasonable margin (by 0.67% in Patch Verification, 2.25% in Patch Retrieval and 2.08% in Image Matching). The "illum" and "view" have also evaluated separately (results provided in FIGS. 10 and 11). FIG. 10 is a table showing results for HPatches "view" split. FIG. 11 is a table showing results for HPatches "illum" split. Mean Average Precision (mAP) of both tables are reported. Best results are highlighted in bold.

In general, "illum" split provided a more challenging dataset as compared to the "view" due to the presence of extreme illumination variations (including day/night light variations). Network utilizing the Twin Negative mining sampling along-with the quad loss according to the embodiment of the present invention, surpasses all conventional results in these experiments.

D. Analysis of Twin-Net Descriptor

Figure 12:
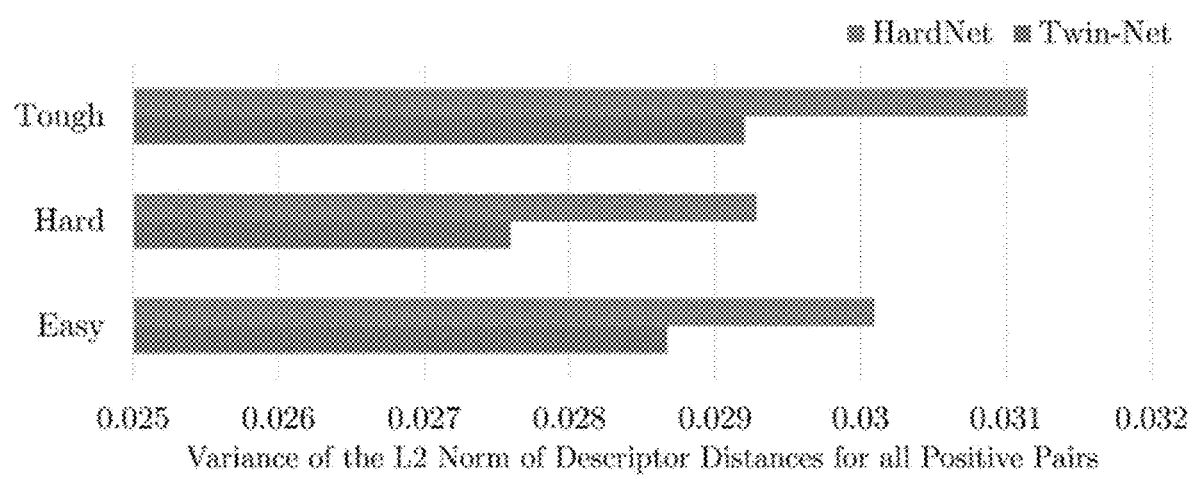
FIG. 12 is a view illustrating diagrams comparing the performance of an embodiment of the present invention and HardNet on HPatches for a matching pair (positive pair).
Figure 13:
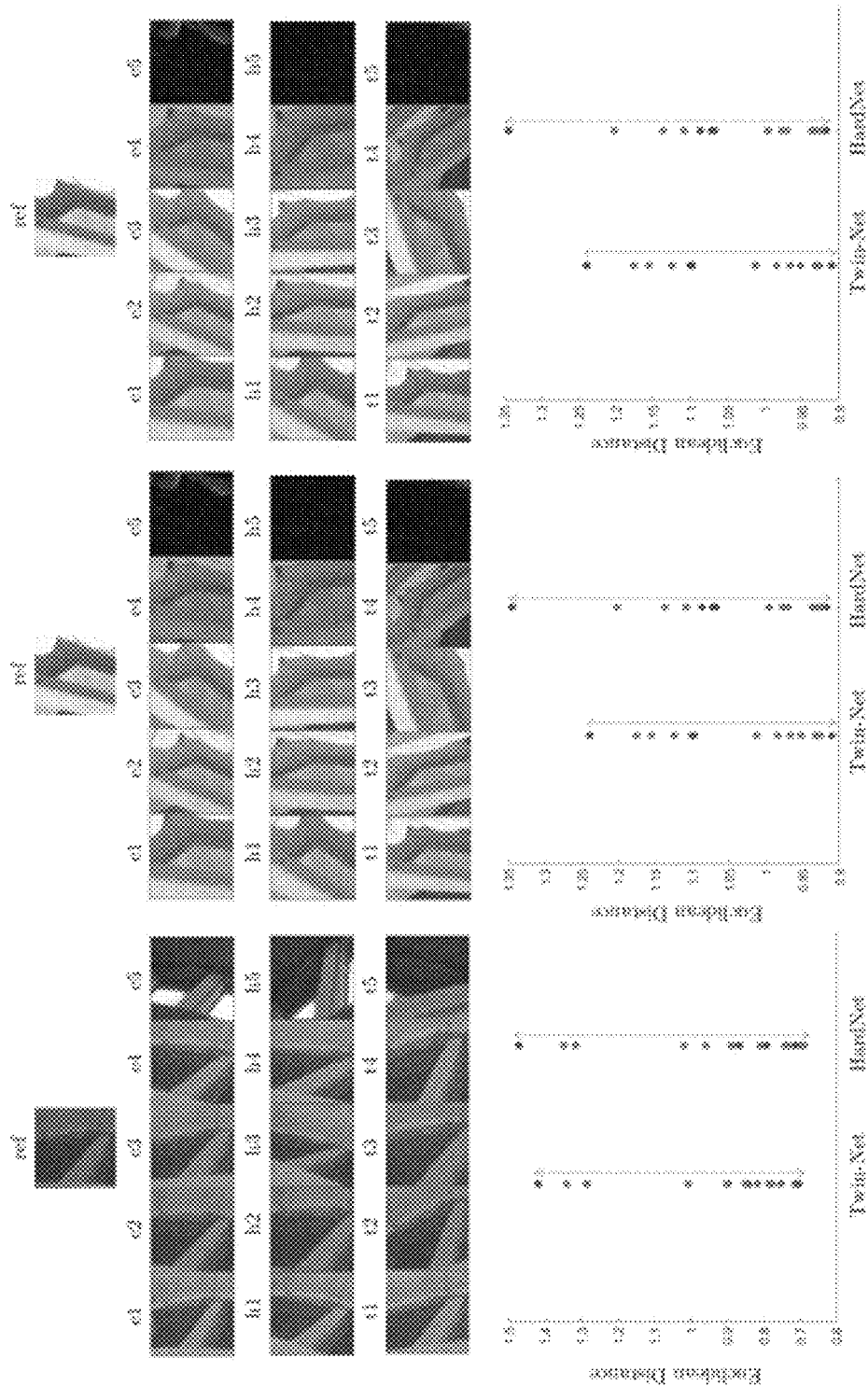
FIG. 13 is a view illustrating intra-class variances for an embodiment of the present invention and HardNet descriptors.

A robust descriptor should be able to better discriminate between the positive and the negative pairs. Let us consider each positive pair as belonging to a positive class and the rest of the pairs as its negative class. Thus, learned descriptors of the instances belonging to the same class should lie closer in the L2 space as compared to the ones that are negatives to them. In other words, a robust descriptor should provide a low intra-class variation for the positive class in terms of the L2 distance. To evaluate this, we compared the variance of L2 Norm of the descriptors obtained via Twin-Net to that of HardNet for all the positive pairs, for Easy, Hard and Tough cases of HPatches. Results have been plotted in FIG. 12. FIG. 12 is a view illustrating diagrams comparing the performance of an embodiment of the present invention and HardNet on HPatches for a matching pair (positive pair). Plot shows the variance of the L2 Norm of the descriptors for all positive pairs. The smaller the variance, the better it is. Twin-Net's variance is lower as compared to HardNet's for "Easy", "Hard" and "Tough" cases of HPatches. Variance for Twin-Net is consistently smaller than that of HardNet's for Easy, Hard and Tough. This indicates that intra-class variation is reduced for the case of Twin-Net.

To perform qualitative analysis, we randomly select three reference patches. For each of these, we computed the L2 norm (Euclidean Distance) between the descriptors of reference patch and its 15 positives (5 each from Easy, Hard and Tough). These L2 Distances for Twin-Net and HardNet are plotted in FIG. 4. For each reference patch, corresponding "Easy (e)", "Hard (h)" and "Tough (t)", patches are highlighted with Medium tone gray, Dark tone gray and Light tone gray respectively. The L2 Distances of patches belonging to positive class are plotted w.r.t reference patch (shown at bottom row). The spread of clusters represent the intra-class variation for both HardNet and Twin-Net respectively. In comparison to HardNet, positive patches are more closer and forms a small cluster in case of Twin-Net which shows smaller intra-class variation. It can be observed that Twin-Net provides L2 matching scores with relatively lower variance for the positive patches. Thus, intra-class variation for the positive class is reduced in case of Twin-Net.

Figure 14:
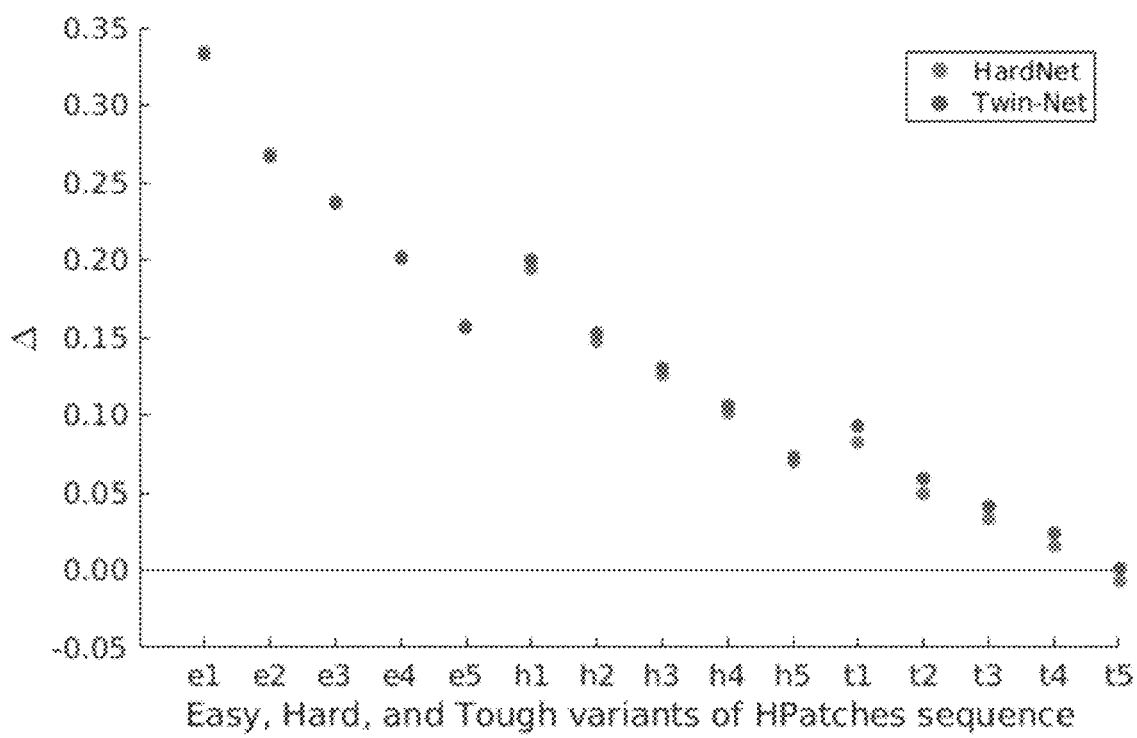
FIG. 14 is a view illustrating performance comparison of embodiment according to the present invention and HardNet on HPatches.

Next, Twin-Net's discriminatory strength is compared by observing the inter-class scores, i.e. the difference between the means of positive pairs' L2 distance and the negative pairs' L2 distance. For each reference patch, the top 3 nearest negatives are picked and the mean of their matching scores is calculated. Next, the mean of the matching scores is subtracted from the mean of positives for the same reference. This measure is called as Delta $\Delta$ and it is reported for both Twin-Net and HardNet in FIG. 14. In detail, $\Delta$ represents the difference between the averaged L2 distance of positive and negative pairs. Difference is translated as higher the better. For 'Easy', both are performing almost same. But as it move from 'Hard' to 'Tough', Twin-Net is evidently performing better as the difference is increasing.

Again, It can be observed that for 'Easy', both Twin-Net and HardNet are providing comparable values of $\Delta$. But as we move to 'Hard' and 'Tough' cases, Twin-Net is provides a higher value of $\Delta$, thus highlighting its higher inter-class discriminatory strength as compared to HardNet. Thus Twin-Net's consistently better performance as compared to HardNet in all the evaluations mentioned earlier is justified.

E. Time Complexity

For a mini-batch of size M=1024, a single training epoch on Liberty takes less than 12 minutes on an Nvidia 1080 Ti GPU. On a single patch of size 32×32, Twin-Net takes $3.31 \times 10^{-6}$ seconds to produce 128 dimensional descriptor. The average time is computed using the 1000 patches.

Figures 15, 16:
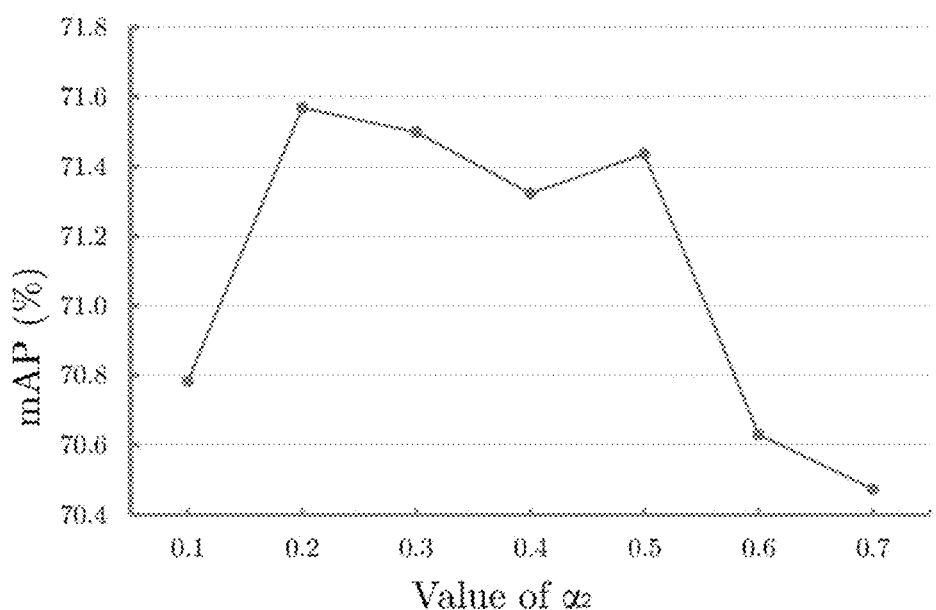
FIG. 15 is a view illustrating performance evaluation on HPatches datasets with varying values of the second margin.
FIG. 16 is a table showing evaluation results by item for the conventional sampling method using random sampling or existing sampling and an embodiment of the present invention performing twin negative sampling.

F. Ablation Study loss function according to the embodiment of the present invention depends on two margins $\alpha_1$ and $\alpha_2$; with $\alpha_2$ less than $\alpha_1$. In order to search for optimal value of $\alpha_2$, we performed several experiment by changing the value of $\alpha_2$ and kept the value $\alpha_1$ equal to 1. Note: Since we are using L2 distance each distance cannot be greater than two or less than zero. Since $\alpha_1$ is a margin between two distances, setting it to "1" pushes one of the distances to be less than or equal to "1" and other to be greater than or equal to "1". This is allowed to pick the best value of $\alpha_2$ for all our evaluations. The results for these experiments are provided in FIG. 15. FIG. 15 is a view illustrating performance evaluation on HPatches datasets with varying values of the second margin). The metric is Mean Average Precision (mAP) averaged over all three evaluation tasks of HPatches benchmark i.e. matching, verification and retrieval. Reviewing FIG. 15, $\alpha_2$ with the value of 0.2 is giving the best results. Thus, all models are trained with $\alpha_1=1$ and $\alpha_2=0.2$.

To further highlight the significance of the Twin Negative Mining based sampling strategy according to the embodiment of the present invention, experiments with different combinations of sampling strategies and loss functions were performed. The results on HPatches dataset are reported in FIG. 16. In random sampling, for each $(a_i, p_i)$ a negative sample is selected randomly for triplet margin and in case of Twin-Net (R; conventional Twin-Net) both the negatives are sampled randomly. All the models are trained for 10 epochs on Liberty dataset. The value of $\alpha_1$ was set to 1 for both the triplet and Twin-Net based training. For Twin-Net the value of $\alpha_2$ is set to =0.2. It can be observed that the Twin sampling according to the embodiment of the present invention outperforms the random and hardest-in-batch sampling, for all the three evaluation tasks.

According to the present invention, an image deep learning model training method and device for improving deep learning-based feature description and matching performance may be provided.

According to the present invention, since a simple distance function is used which adopts a descriptor used in a hand-crafted method, a matching work is convenient and a conventional system may be easily replaced.

Effects obtained in the present invention are not limited to the above-mentioned effects, and other effects not mentioned above may be clearly understood by those skilled in the art.

The technical problems solved by the present invention are not limited to the above technical problems and other technical problems which are not described herein will become apparent to those skilled in the art from the above description.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present invention by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. Method of training an image deep learning model comprising:
   sampling a twin negative comprising a first negative sample and a second negative sample, the sampling includes:
      selecting the first negative sample, the first negative sample having a highest, among a plurality of predefined classes, similarity to either of an anchor sample and a positive sample in which the anchor sample and the positive sample are a matching pair in a class of the plurality of predefined classes and different from a class of the first negative sample; and selecting the second negative sample in which the second negative sample has a highest, among classes of the plurality of predefined classes that are different from the class of the matching pair and different from the class of the first negative sample, similarity to the first negative sample; and training the image deep learning model, based on the anchor sample, the positive sample, and the first and second negative samples, to minimize a loss of a loss function in each class.

2. The method of claim 1,
wherein a multiplicity of first non-matching pairs comprising the positive sample of the matching pair and anchor samples belonging to classes different from the class respectively as pair elements and a multiplicity of second non-matching pairs comprising the anchor sample of the matching pair and positive samples belonging to classes different from the class respectively as pair elements are adopted as first negative candidates, and the anchor or positive sample of the different class belonging to a non-matching pair with the highest similarity among the first and second non-matching pairs is selected as the first negative sample.

3. The method of claim 1,
wherein a multiplicity of third non-matching pair comprising any one sample of the anchor sample and the positive sample constituting the first negative sample as a first element of a pair and respective samples belonging to different classes from the matching pair and the first negative sample and to a different kind from that of the first negative sample as a second element of the pair is adopted as a second negative candidate, and a sample of the different kind belonging to a third non-matching pair with a highest similarity among the third non-matching pairs is selected as the second negative sample.

4. The method of claim 1,
wherein the class makes clusters of the anchor sample and the positive sample for images based on a same object, and the matching pair is a pair of the anchor sample and the positive sample, which are extracted at a same location in an image of the same object, and the anchor sample, the positive sample, and the first and second negative samples include patches that are obtained in pixels of predetermined unit around a feature extracted from an image.

5. The method of claim 1,
wherein the similarity is calculated based on a distance between the anchor sample and the positive sample, and the highest similarity judges a sample with a shortest distance among distances of the anchor sample and the positive sample as a negative sample.

6. The method of claim 5,
wherein the distance is calculated using a descriptor describing a patch of the anchor sample and the positive sample, and the descriptor has an n-dimensional vector.

7. The method of claim 1,
wherein the loss function comprises an inter class distance function defining a distance between different classes and an intra class distance function defining a distance between the anchor sample and the positive sample within a same class.

8. The method of claim 7,
wherein the inter class distance function and the intra class distance function are not computed by adding up all classes of the plurality of predefined classes but are computed for each class, and then the image deep learning model are learned to minimize the loss of the loss function in each class.

9. The method of claim 7,
wherein the inter class distance function comprises a first margin and the intra class distance function comprises a second margin, and the first margin is set to a larger value than the second margin.

10. A device for training an image deep learning model comprising:
a transceiver receiving samples for a training target;
a memory storing instructions to train an image deep learning model for the samples; and
a processor configured to execute the instructions, configuring the processor to be configured to:
sample a twin negative comprising a first negative sample and a second negative sample, the sampling includes:
selecting, among a plurality of predefined classes, with a highest similarity to either of an anchor sample and a positive sample in which the anchor sample and the positive sample are a matching pair in a class of the plurality of predefined classes, as the first negative sample, the first negative sample is selected from a class different from the class of the matching pair; and selecting the second negative sample in which the second negative sample has a highest, among classes of the plurality of the predefined classes that are different from the class of the matching pair and different from a class of the first negative sample, similarity to the first negative sample, and training the image deep learning model, based on the anchor sample, the positive sample, and the first and second negative samples, to minimize a loss of a loss function in each class.

11. The device of claim 10,
wherein a multiplicity of first non-matching pairs comprising the positive sample of the matching pair and anchor samples belonging to classes different from the class respectively as pair elements and a multiplicity of second non-matching pairs comprising the anchor sample of the matching pair and positive samples belonging to classes different from the class respectively as pair elements are adopted as first negative candidates, and the anchor or positive sample of the different class belonging to a non-matching pair with the highest similarity among the first and second non-matching pairs is selected as the first negative sample.

12. The device of claim 10,
wherein a multiplicity of third non-matching pair comprising any one sample of the anchor sample and the positive sample constituting the first negative sample as a first element of a pair and respective samples belonging to different classes from the matching pair and the first negative sample and to a different kind from that of the first negative sample as a second element of the pair is adopted as a second negative candidate, and a sample of the different kind belonging to a third non-matching pair with a highest similarity among the third non-matching pairs is selected as the second negative sample.

13. The device of claim 10,
wherein the class makes clusters of the anchor sample and the positive sample for images based on a same object, and the matching pair is a pair of the anchor sample and the positive sample, which are extracted at a same location in an image of the same object, and the anchor sample, the positive sample, and the first and second negative samples include patches that are obtained in pixels of predetermined unit around a feature extracted from an image.

14. The device of claim 10, wherein the similarity is calculated based on a distance between the anchor sample and the positive sample, and the highest similarity judges a sample with a shortest distance among distances of the anchor sample and the positive sample as a negative sample.

15. The device of claim 14, wherein the distance is calculated using a descriptor describing a patch of the anchor sample and the positive sample, and the descriptor has an n-dimensional vector.

16. The device of claim 10, wherein the loss function comprises an inter class distance function defining a distance between different classes and an intra class distance function defining a distance between the anchor sample and the positive sample within a same class.

17. The device of claim 16, wherein the inter class distance function and the intra class distance function are not computed by adding up all classes of the plurality of predefined classes but are computed for each class, and then the image deep learning model are learned to minimize the loss of the loss function in each class.

18. The device of claim 16, wherein the inter class distance function comprises a first margin and the intra class distance function comprises a second margin, and the first margin is set to a larger value than the second margin.

* * * * *